Aug. 1, 1933.  J. ROBINSON  1,920,277
AUTOMATIC TRAIN PIPE CONNECTER HEAD
Original Filed June 24, 1929  2 Sheets-Sheet 1
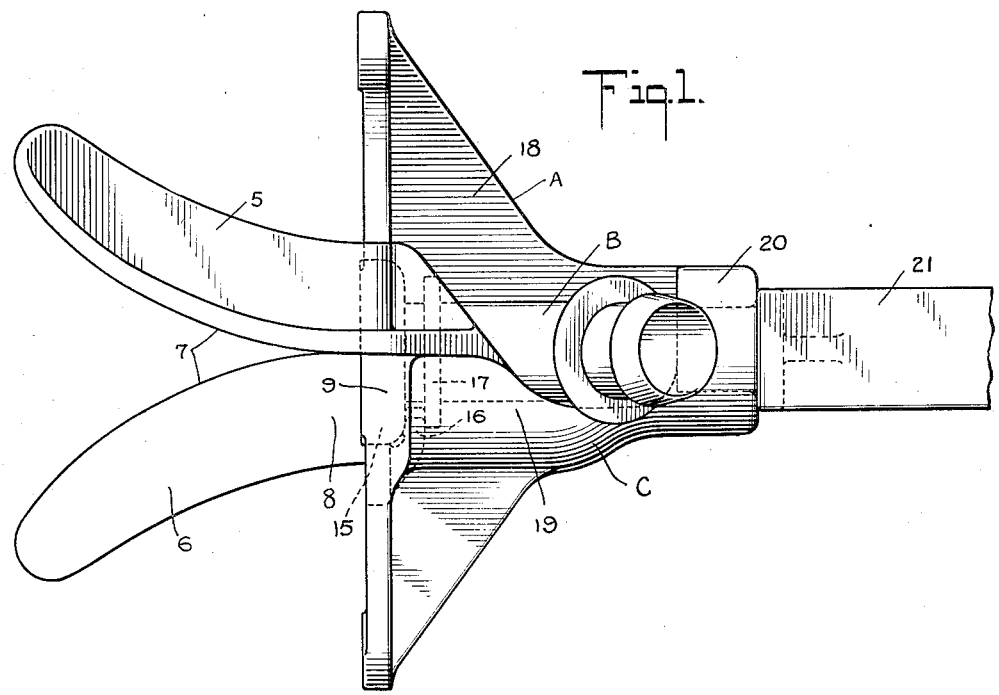
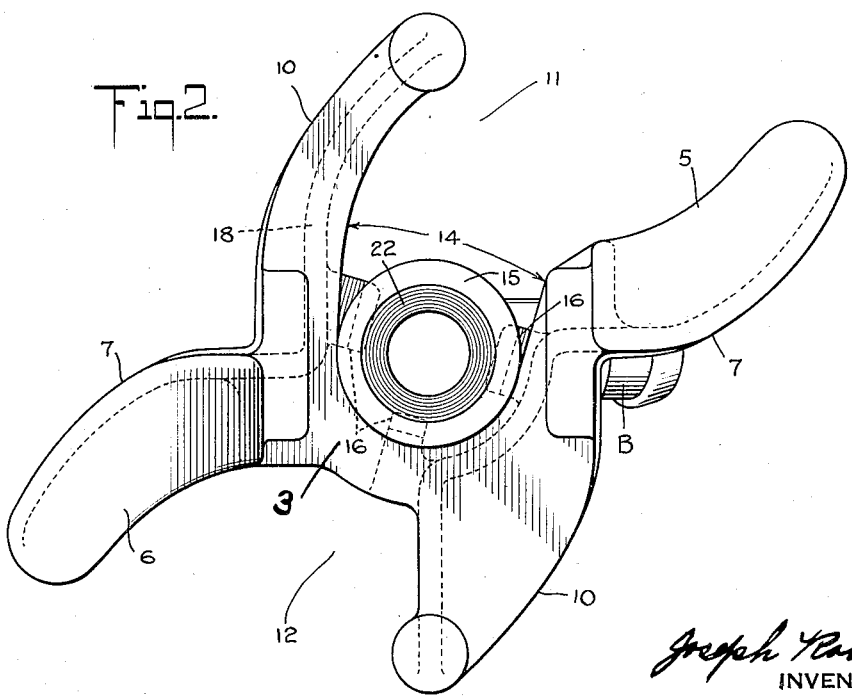

Aug. 1. 1933.  J. ROBINSON  1,920,277
AUTOMATIC TRAIN PIPE CONNECTER HEAD
Original Filed June 24, 1929  2 Sheets-Sheet 2
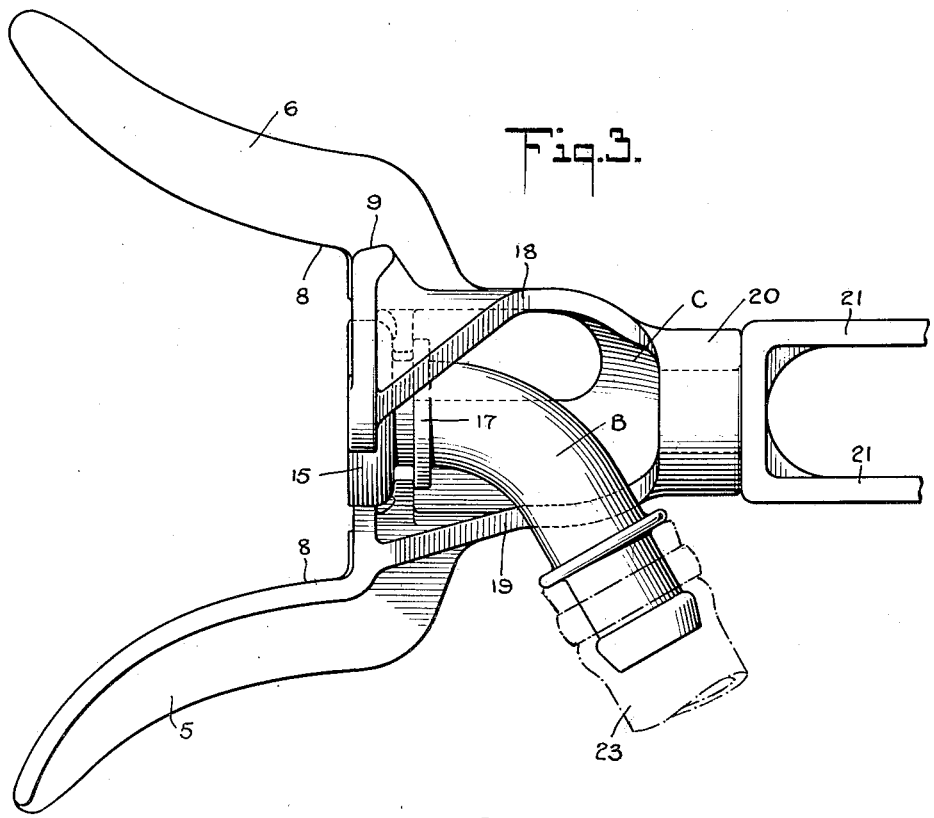
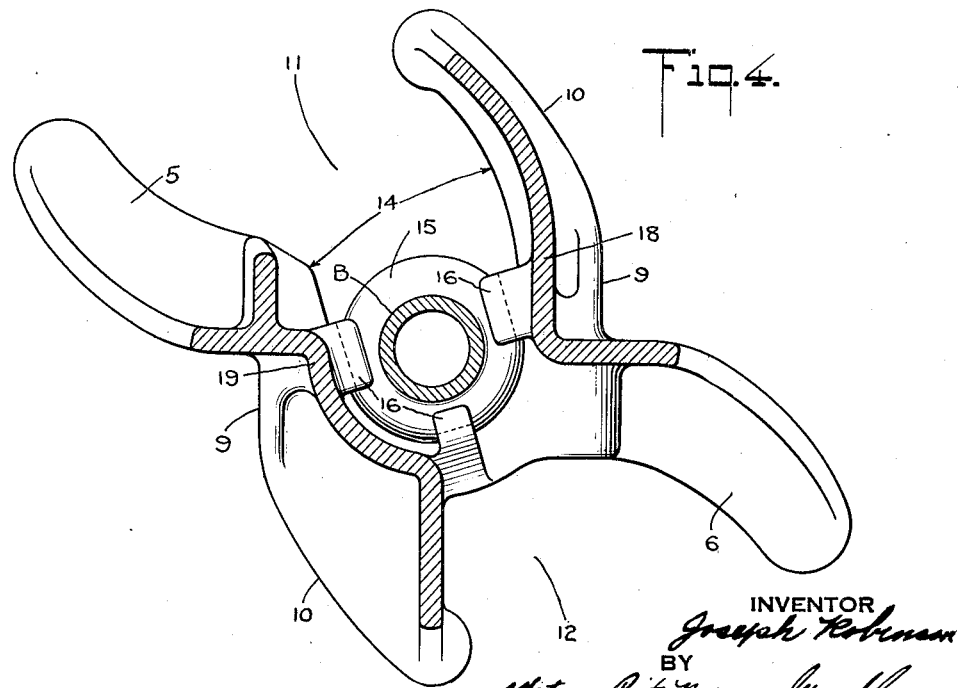
INVENTOR
Joseph Robinson
BY
ATTORNEYS Patented Aug. 1, 1933

1,920,277

UNITED STATES PATENT OFFICE 1,920,277

AUTOMATIC TRAIN PIPE CONNECTER HEAD

Joseph Robinson, New York, N. Y.

Application June 24, 1929, Serial No. 373,325
Renewed October 21, 1932

10 Claims. (Cl. 285—58.)

This invention relates to improvements in automatic train pipe connecters, and especially to means for renewing defective gaskets between the faces of connecter heads while such heads remain coupled. In carrying out my improvement I construct the coupling head so that the fluid conduit which carries the gasket to be removed is locked in the head by a special slide joint arranged at the front end of the conduit. Portions of the coupling head are cut away to prevent the accumulation of snow and ice interfering with the operation of my improvement, or with the efficient coupling of mating connecter heads. It will be understood that my improvement may be used in any of the ports of an automatic train pipe coupling head, either the signal port, the air brake port, which is usually located at the center of the head as in the present drawings, or the steam port.

My improvement is shown in Figure 1 in side elevation;

Figure 2 is a front elevation of the construction shown in Figure 1;

Figure 3 is a plan view of the construction shown in Figure 1, and

Figure 4 is a sectional rear elevation of Figure 1.

While I show my improved gasket renewing means as it would be employed in a connecter head A of the wing type, it may readily be used with a connecter head of the pin and funnel type. In the drawings of this application the removable fitting B is shown mounted at approximately the center of the head in the air brake port, but my improvement may, as aforesaid, be employed for the signal, steam, or other port.

The coupling head A is of the general type shown in my copending application Serial #363,507 filed May 16th, 1929. It is provided with a front coupling face or portion indicated at 3, Figure 1, which is arranged substantially vertical and adapted to abut a similar face on a mating head. It is also provided with two diagonally spaced forwardly extending outwardly diverging guiding wings or prongs 5 and 6, the guiding edges 7 of which are disposed one slightly above and one slightly below the transverse center line of the head. Each wing is provided with an inner surface 8 disposed in approximately a vertical plane for closely receiving the complementary sides 9 of an opposing head. Each said complementary side extends or curves inwardly toward the vertical center of the head as shown at 10. The guides 5 and 6 are quite narrow vertically, though amply strong for the purpose required, and that portion of the head lying between each end thereof and above the guides 5 and 6 is cut away as at 11 and 12, to approximately the vertical center line or major axis of the head. Leading inwardly from above the guide 5 I provide an opening or slotted way 14 for the enlarged head 15 of the conduit B. Normally the head of the conduit rests at the bottom of this slot or way, as shown, three spaced lugs or dogs 16 being provided and formed to curve around the head 15 of the conduit and closely receive the same as illustrated especially in Figures 3 and 4. An annular flange or collar 17 is provided on the conduit just back of the inwardly curved portion of the dogs to prevent the conduit moving forward unduly in its seat or slot in the head A when the latter is uncoupled from a mating head. The space between the head 15 and flange 17 constitutes a groove or recess around the conduit B. A shank C formed integrally with or otherwise connected to the head extends rearwardly therefrom and is hollow as shown. More specifically the shank comprises spaced ribs or walls 18 and 19 which extend a substantial distance to the rear of the head and are joined by a portion or sleeve 20. Into this sleeve is pressed or otherwise secured a supporting member comprising spaced straps 21 which span or extend through a suitable supporting bracket, not shown. It will be observed in Figure 1 that the web 19 of the head is cut away as it approaches the sleeve 20 in order to accomodate the laterally diverging rear portion of the conduit B, see Figure 3. An expansible gasket 22 is carried in the forward end 15 of the conduit B. The details of this gasket are shown in my co-pending application Serial #360,195 filed May 3rd, 1929. When the fluid pressure is admitted to the conduit it enters the gasket and expands the latter tightly against an opposing gasket, at which time the conduit is driven tightly against the dogs 16 thus firmly locking the conduit in the service position shown.

To remove a defective gasket it is but necessary to grasp the conduit adjacent the collar and lift the conduit out of its seat in the head. The gasket 22 may then be removed and a new one inserted and the conduit replaced by pressing it down into its seat in the head. It will be observed that the gasket lies in approximately the plane of the face of the fitting B. This is to prevent fouling of the gaskets as they slide past each other when the conduit is inserted and removed for the purpose described. It will be understood that this position of the gasket in the conduit would be impractical except with a gasket of the type shown which expands when the fluid pressure is admitted, thus moving the front portion of the gasket forward into tight engagement with the mating gasket.

A suitable hose 23—Figure 3—is attached in any desired manner to the rear end of the conduit B and tends normally, by its weight and resilience (a metal hose may be used) to hold the conduit firmly in its seat in the head. When the fluid pressure is admitted the hose tends to straighten out which draws the conduit more firmly into its seat in the head A.

Various different means for mounting the head on its supporting member may of course be provided. I do not therefore wish to be limited to the particular construction shown in which the shank C is formed integrally with the head, as I am aware that it may be suitably formed separately therefrom and secured thereto. The conduit B may be passed through the head at an angle of 45° to the railroad track, an example of which mounting is shown in my co-pending application Serial #287,250 filed June 21st, 1928.

What I claim is:

1. In combination, an automatic train pipe connecter head having an opening extending therethrough, a conduit mounted in said opening, means for preventing longitudinal movement of said conduit in said opening, said means comprising a projection rigid with the head extending inwardly toward the center of said opening and engaging said conduit, said head having a slot or way extending laterally from said opening, and also extending from the front face of the head rearwardly, said slot being of sufficient width to permit passage of said conduit laterally, and whereby said conduit may be moved laterally through said slot and out of said engagement with said projection and out of said opening.

2. In combination, an automatic train pipe connecter head having an opening extending therethrough, a conduit mounted in said opening, cooperating means on said head and conduit for preventing movement of said conduit longitudinally in said opening, said means comprising a projection rigidly mounted on one of said last named parts and a recess on the other part for receiving said projection, said head having a slot or way extending laterally from said opening, and also extending from the front face of said head rearwardly, through which slot said conduit may be moved laterally to disengage said projection from said recess and out of said opening.

3. In combination, a connecter head having an opening extending longitudinally therethrough, a conduit mounted in said opening, means for holding said conduit against longitudinal movement in said opening, said means comprising projections rigid with the head extending inwardly into said opening and engaging said conduit, said projections being so spaced as to permit disengagement therefrom upon movement of said conduit laterally of said opening, said head being provided with a slot or way in one side thereof extending from the front face rearwardly to permit lateral movement of said conduit out of engagement with said projections and out of said opening.

4. In combination, an automatic train pipe connecter head having a vertically arranged coupling portion adapted to contact with a similar portion on a mating head, said head also having a hollow shank extending rearwardly from said coupling portion, said coupling portion and said shank being cut away on one side to permit insertion of a conduit into said hollow portion by moving the same laterally of the head, and means formed on the inner wall of said hollow portion for engaging a conduit inserted therein and holding the same against longitudinal movement in such hollow portion.

5. In combination, an automatic train pipe connecter head having a vertically arranged coupling portion adapted to contact with a similar portion on a mating head, said head also having a hollow shank extending rearwardly from said coupling portion, said coupling portion and said shank being cut away on one side to permit insertion of a conduit into said hollow portion by moving the same laterally of the head, projections formed on the inner wall of said hollow portion and extending inwardly thereof for engaging a conduit inserted therein and holding the same against longitudinal movement in such hollow portion.

6. In combination, an automatic train pipe connecter head having a vertically arranged coupling portion adapted to contact with a similar portion on a mating head, said head also having a hollow shank extending rearwardly from said coupling portion, said coupling portion and said shank being cut away on one side to permit insertion of a conduit into said hollow portion by moving the same laterally of the head, a conduit arranged in said hollow portion and having a recess, and projections formed on the inner wall of said hollow portion and engaging said recess for holding the conduit against longitudinal movement in said hollow portion.

7. In combination, an automatic train pipe connecter head having a vertically arranged coupling portion adapted to contact with a similar portion on a mating head, said head also having a hollow shank extending rearwardly from said coupling portion, said coupling portion and said shank being cut away on one side to permit insertion of a conduit into said hollow portion by moving the same laterally of the head, a conduit arranged in said hollow portion and having a circumferential recess, and projections formed on the inner wall of said hollow portion and engaging said recess for holding the conduit against longitudinal movement in said hollow portion.

8. An automatic train pipe connecter head having a hollow portion adapted to receive a fluid conducting conduit, said hollow portion being cut away at the side thereof to permit introduction of a conduit into the same by moving the conduit substantially at right angles to the longitudinal axis of the head, said head having parts rigid therewith extending inwardly into said hollow portion, said conduit having a groove therein adjacent its front end, into which groove said parts of the head are adapted to enter when the conduit is forced into the head.

9. An automatic train pipe connecter head having a hollow portion adapted to receive a conduit, said head having projections extending inwardly from the wall thereof toward the center of said hollow portion, a conduit adapted for insertion into said hollow portion of the head and having a groove on the periphery thereof into which said projections are adapted to extend when said conduit is inserted in said hollow portion of the head.

10. An automatic train pipe connecter head having a hollow portion arranged rearwardly of the coupling face of the head and also having a series of projections which extend inwardly from the outer wall of said hollow portion toward the center thereof, said projections being spaced rearwardly from the coupling face of the head, and a conduit adapted to be inserted in said hollow portion, said conduit having on the periphery thereof spaced portions adapted to provide a recess into which said projections enter when the conduit is inserted in the head.

JOSEPH ROBINSON.